United States Patent [19]

Arnold et al.

[11] Patent Number: 5,551,805
[45] Date of Patent: Sep. 3, 1996

[54] ANCHORING CARTRIDGE FOR ANCHORING A FASTENING ELEMENT IN A DRILLED HOLE

[75] Inventors: Norbert Arnold, Waldachtal; Willi Haug, Freudenstadt, both of Germany

[73] Assignee: fischerwerke Artur Fischer GmbH & Co. KG, Waldachtal, Germany

[21] Appl. No.: 192,702

[22] Filed: Feb. 7, 1994

[30] Foreign Application Priority Data

Feb. 16, 1993 [DE] Germany .................. 43 04 620.7

[51] Int. Cl.$^6$ ................................................ E21D 20/02
[52] U.S. Cl. .................. 405/259.6; 52/704; 206/219; 405/259.5
[58] Field of Search .............. 405/259.6; 206/219, 206/220; 52/704

[56] References Cited

U.S. PATENT DOCUMENTS

| | | | |
|---|---|---|---|
| 4,136,134 | 1/1979 | Plaisted | 206/219 X |
| 4,291,799 | 9/1981 | Bower | 206/219 |
| 4,378,181 | 3/1983 | Beveridge et al. | 405/259.6 |
| 4,490,074 | 12/1984 | Chaiko | 405/259.6 X |
| 4,516,884 | 5/1985 | Douty | 405/259.6 |
| 4,528,792 | 7/1985 | Cross et al. | 405/259.6 X |

FOREIGN PATENT DOCUMENTS

| | | |
|---|---|---|
| 1205038 | 9/1959 | Germany . |
| 3638750 | 5/1988 | Germany . |
| 3940138 | 6/1991 | Germany . |
| 3940309 | 6/1991 | Germany . |
| 4121832 | 6/1992 | Germany . |

OTHER PUBLICATIONS

Saechtling–Zebrowski: Kunststoff–Taschenbuch, 19th Edition, 1974, pp. 388–390.

*Primary Examiner*—Dennis L. Taylor
*Attorney, Agent, or Firm*—Michael J. Striker

[57] ABSTRACT

The anchoring cartridge for anchoring a fastening element in a drilled hole has two chambers. One chamber contains from 1.0 to 10% of a hardener component dissolved in a mixture of styrene and an unaccelerated radical-curing resin and the other chamber contains an accelerator mixed with another mixture of styrene and unaccelerated radical-curing resin. By including unaccererated radical-curing resin in both chambers a homogeneous curing of the components is ensured.

4 Claims, No Drawings

ANCHORING CARTRIDGE FOR ANCHORING A FASTENING ELEMENT IN A DRILLED HOLE

BACKGROUND OF THE INVENTION

The present invention relates to a readily destructible anchoring cartridge for anchoring a fastening element in a drilled hole.

The use of reactive resin compositions based on unsaturated polyester resins, vinyl ester resins or acrylic resins as bonding agents and adhesives in chemical fastening methods has been known for a long time (DE-OS 39 40 309, DE-OS 39 40 138, DE-OS 36 38 750). Those reactive resin compositions are two-component systems, one component containing the pre-accelerated reactive resin and the other component containing the hardener. Other customary constituents, such as fillers, stabilizers, accelerators, thixotropic agents, reactive diluents, and inhibitors, may be contained in the one and/or the other component.

Although such anchoring systems have been used for several years in fastening technology, they do have some disadvantages. Those disadvantages reside in the inhomogeneous curing of the components. The hardener particles act like seeds from which the curing reaction originates. The concentration gradient unavoidably associated therewith leads to defects and stresses in the cured resin body.

A further negative aspect of the prior art is that the customary setting process using a drilling machine is not conducive to thorough mixing of the components, which has to be compensated for by the increased use of hardener, desensitizing agents and reactive diluent.

If thorough mixing does not take place at the beginning of the setting process, the excess resin escapes from the drilled hole, thereby soiling the fastening site.

SUMMARY OF THE INVENTION

It is an object of the present invention to provide an anchoring cartridge that ensures homogeneous curing of the components, and also reduces the amount of hardener used, based on the total amount of resin.

According to the invention, the anchoring cartridge has at least two chambers for anchoring a fastening element in a drilled hole. One chamber contains a hardener component that comprises an unaccelerated radical-curing resin in which a predetermined amount of hardener is dissolved and the other chamber contains a resin that is mixed with an accelerator.

By using a hardener component that comprises an unaccelerated, radical-curing resin in which from 1.0 to 10% by weight of hardener is dissolved, based on the total resin content of the cartridge, the hardener containing up to 50% by weight of peroxide, homogeneous curing of the components is ensured after the cartridge has been destroyed.

The advantages of the homogeneously curing composite cartridge, such as lower hardener consumption and homogeneous curing, are achieved by the presence of two miscible, liquid components.

Unsaturated polyester resins, vinyl ester resins, acrylic resins or also other radical-curable monomers and reactive diluent/polymer combinations can be used as radical-curing resin.

The same resin or different resins, for example a vinyl ester resin with a polyester resin or a vinyl ester resin with an acrylic resin, can be used in the two chambers.

Investigations have shown that especially good results are obtained when the peroxide contained in the hardener component forms thermally polymerization-inducing cleavage products, otherwise known as radicals, only above approximately 50° C. For example, peroxides from the groups of the ketone peroxides, alkyl peresters or diacyl peroxides, especially dibenzoyl peroxide, may be used, but, in principle, any inhibitor suitable for cold curing may also be used.

Inhibitors, such as, for example, 4-tert-butylpyrocatechol, 4-methoxyphenol and p-benzoquinone, may be added to prolong the shelf life.

To anchor a fastening element in a fastening base, a destructible multi-chamber cartridge that contains the components according to the invention is introduced into a drilled hole in the fastening base in a manner known per se.

The cartridge is then destroyed by driving in the fastening element, for example an anchor rod, by an impact drilling machine or a drilling machine or simply by hitting it in with a hammer.

The components are mixed and the curing reaction is started. The good mixing characteristics also permit impact mounting with high holding values. The excess mortar composition which escapes from the drilled hole during setting is completely cured.

Harm to the environment caused by the emission of monomers, for example styrene, is thereby avoided.

The following Examples demonstrate the implementation of the present invention and illustrate the improvement of properties in comparison with the prior art.

| EXAMPLES | | |
|---|---|---|
| Example 1 | vinyl ester epoxy resin | 61.75 g |
| | styrene | 33.25 g |
| | dibenzoyl peroxide | 2.5 g |
| | desensitizing agent | 2.5 g |
| | | 100.0 g |
| Example 2 | vinyl ester epoxy resin | 53.1 g |
| | styrene (41%) | 36.9 g |
| | dibenzoyl peroxide | 5.0 g |
| | desensitizing agent | 5.0 g |
| | | 100.0 g |
| Example 3 | vinyl ester epoxy resin | 64.8 g |
| | styrene | 34.9 g |
| | dimethyl-p-toluidine | 0.3 g |
| | | 100.0 g |
| Example 4 | vinyl ester epoxy resin | 58.82 g |
| | styrene | 40.88 g |
| | dimethyl-p-toluidine | 0.3 g |
| | | 100.0 g |
| Example 5 | size M12 cartridge | |
| | 0.77% by weight BPO/on total resin content | |
| | Inner cartridge content: | |
| | resin according to Example 3 | 2.76 g |
| | silica sand (particle size 1.0–1.8 mm) | 6.60 g |
| | Outer cartridge content: | |
| | resin according to Example 1 mounting: impact torsion mounting | 1.24 g |

EXAMPLES

Example 6
cure time: 0.5 h
concrete: B45
holding power: 35.5 kN
bonding strength: 9.5 N/mm$^2$
Failure: bonding
Excess: completely cured after 15 min.
size M12 cartridge 2.5% by weight BPO/on total resin content
Inner cartridge content:

| | |
|---|---|
| resin according to Example 4 | 2.0 g |
| silica sand (particle size 1.0–1.8 mm) | 8.0 g |

Outer cartridge content:

| | |
|---|---|
| resin according to Example 2 | 2.0 g | mounting: impact torsion mounting
cure time: 0.5 h
concrete: B45
holding power: 45.2 kN
bonding strength: 12.1 N/mm$^2$
failure: steel
Excess: completely cured after 7 min.

Example 7
size M12 cartridge 1.5% by weight BPO/on total resin content
Inner cartridge content:

| | |
|---|---|
| resin according to Example 4 | 2.8 g |
| silica sand (particle size 1.0–1.8 mm) | 6.0 g |

Outer cartridge content:

| | |
|---|---|
| resin according to Example 2 | 1.2 g | mounting: impact mounting
cure time: 120 min.
concrete: B45
holding power: 41.5 kN
bonding strength: 9.3 N/mm$^2$
failure: steel
Excess: completely cured after 10 min.

Example 8
cartridge as in Example 6, except:
mounting: impact mounting
cure time: 120 min.
concrete: B45
holding power: 50.5 kN
bonding strength: 11.3 N/mm$^2$
failure: steel
Excess: completely cured after 7 min.

Example 9
cartridge as in Example 5 mounting: impact mounting
cure time: 120 min.
holding power: 40.5 kN
bonding strength: 9.1 N/mm$^2$
failure: steel
Excess: completely cured after 14 min.

While the invention has been illustrated and embodied in an anchoring cartridge for anchoring a fastening element in a drilled hole, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Anchoring cartridge for anchoring a fastening element in a drilled hole, said anchoring cartridge comprising at least two chambers, wherein one of said chambers contains from 1.0 to 10% of a hardener component dissolved in a mixture of styrene and an unaccelerated radical-curing resin, and another of said chambers contains an accelerator mixed with another mixture of styrene and said unaccelerated radical-curing resin.

2. Anchoring cartridge according to claim 1, wherein said hardener component contains up to 50% by weight of a peroxide selected from the group consisting of ketone peroxides, alkyl peresters and diacyl peroxides.

3. Anchoring cartridge according to claim 1, wherein said hardener component comprises dibenzoyl peroxide.

4. Anchoring cartridge according to claim 1, wherein said resin comprises a vinyl ester epoxy resin and said accelerator comprises dimethyl-p-toluidine.

* * * * *